Patented Aug. 13, 1940

2,211,630

UNITED STATES PATENT OFFICE 2,211,630

EPHEDRINE GLUCONATE AND PROCESS OF PRODUCING IT

Elmer H. Stuart, Indianapolis, Ind., assignor to Eli Lilly and Company, Indianapolis, Ind., a corporation of Indiana No Drawing. Application February 11, 1939, Serial No. 256,007

3 Claims. (Cl. 260—501)

My invention relates to a new compound of ephedrine with gluconic acid, and the process of producing it.

I have found that ephedrine can be made to combine with gluconic acid to produce a compound which has the general physiological effect of the ephedrine itself but which in addition has certain advantages over the ephedrine itself and its more common salts such for instance as the hydrochloride and the sulfate. These increased advantages include the following:

1. A low surface tension, which give increased wetting power and so facilitates action on the tissues.

2. A marked absence of irritating effect when applied to the tissues.

In making my new product I may use either gluconic acid or its anhydrides (the gluconolactones), such as γ-glyconolactone or δ-gluconolactone. When either of these anhydrides is put into water or ethyl or methyl alcohol, it readily dissolves, and is reconverted into gluconic acid.

In forming my new compound, I dissolve both the gluconic acid (or its anhydrides) and the ephedrine in water or alcohol, in approximately molecular proportions, and allow them to react; which they do fairly promptly at room temperature. The resultant ephedrine gluconate produced may readily be obtained in dry form as a gummy mass by suitably removing the solvent, as by evaporation under vacuum. The compound thus obtained has a specific optical rotation, as observed in a 2.2% solution in water, of $$[\alpha]_D^{25°} = -11.3°$$

This ephedrine gluconate is readily soluble in water, and can be used readily and effectively to make up a water solution which produces this ephedrine effect.

For equal ephedrine effects, such a water solution of ephedrine gluconate is less irritating to the mucous membrane than are water solutions of the ordinary salts, such for instance as ephedrine hydrochloride and ephedrine sulfate; and is less irritating to an even greater degree than is an oil solution of the ephedrine alkaloid.

In addition, the water solution of ephedrine gluconate has a markedly lower surface tension than has a solution of either ephedrine sulfate or ephedrine hydrochloride.

One example of preparing ephedrine gluconate is as follows:

10 grams of ephedrine alkaloid and 10.7 grams of δ-gluconolactone are dissolved together in 100 cc. of ethyl alcohol, which may contain 10% or 15% of methyl alcohol and may if desired be diluted with water to any desired extent. Dissolving is facilitated by stirring, which is sometimes necessary.

The reaction occurs on solution, and is complete when solution is completely effected. Thereupon the solvent may be removed, as by evaporation in vacuo; which leaves a white amorphous solid that is the desired ephedrine gluconate. With the quantities given, the yield is approximately 22 grams.

I claim as my invention:

1. Ephedrine gluconate.
2. The process of producing ephedrine gluconate, which consists in reacting ephedrine with gluconic acid.
3. Ephedrine gluconate in dry form.

ELMER H. STUART.